United States Patent [19]

Krisinski et al.

[11] 4,143,176

[45] Mar. 6, 1979

[54] PEANUT SKIN-OIL EMULSION

[75] Inventors: Arthur E. Krisinski, Menlo Park; Wilbur A. Parker, Bridgewater, both of N.J.

[73] Assignee: CPC International Inc., Englewood Cliffs, N.J.

[21] Appl. No.: 804,823

[22] Filed: Jun. 8, 1977

[51] Int. Cl.² .......................... A23D 5/00; A23L 1/20
[52] U.S. Cl. ..................................... 426/601; 426/632
[58] Field of Search ........................ 426/601, 632, 633

[56] References Cited

U.S. PATENT DOCUMENTS 3,619,207 11/1971 Dzurik et al. ................. 426/633 X
4,000,322 12/1976 Billerbeck et al. ............ 426/633 X

*Primary Examiner*—Robert A. Yoncoskie

[57] ABSTRACT

Peanut butter color and flavor are adjusted by the addition of finely ground peanut skins dispersed in an edible oil. The emulsion of peanut skins in oil may be used to color other food products.

8 Claims, No Drawings

PEANUT SKIN-OIL EMULSION

This invention relates to a process for treating peanut skins which will permit such skins to be added to a peanut butter product as a speck free coloring and flavoring agent. This invention also concerns a coloring agent comprising an edible oil and finely comminuted peanut skins for use in other food applications.

BACKGROUND OF THE INVENTION

This disclosure is directed primarily to the use of the novel coloring agent in peanut butter. Conventional processes for making peanut butter products include the steps of roasting shelled peanuts, cooling and blanching the roasted peanuts to remove the skins, removing the germs from the blanched peanuts, sorting and discarding objectionable peanuts, and finely grinding the acceptable peanuts to obtain a peanut paste. Either before, during or after grinding, additional components are usually added such as sweeteners and salt to achieve desired flavor, a stabilizer to prevent oil separation, and emulsifiers and food grade oils to impart desired mouth feel, melt down in the mouth and good spreadability. The resulting paste can optionally be reground after the additional components are mixed into it to obtain a creamy peanut butter product.

The stabilizers generally employed are high melting fats having a melting point greater than about 110° F., but less than about 160° F. Exemplary of such stabilizers are partially and/or completely hydrogenated fats, mono- and/or di-glyceride esters of saturated fatty acids, and mixtures thereof.

Suitable emulsifiers include fatty monoglycerides, lecithin, and the like.

Illustrative of the food grade oils that can be used are peanut oil, cottonseed oil, palm oil, palm kernel oil, coconut oil, corn oil, soybean oil, and the like, as well as mixtures thereof.

The prior art as characterized in U.S. Pat. No. 3,619,207 has taught the blanching of the peanuts (i.e., removing the skins from the peanuts) in order to limit the amount of peanut skins to no more than about 0.75%, by weight, of the peanut paste component present. When more than this amount of peanut skins is present, the resulting peanut butter will contain dark specks and/or impart a bitter aftertaste. Conventional processing techniques show a marked preference for an upper limit of about 0.15% skins in the peanut paste.

Attempts have been made to increase the peanut skin content of peanut butter products in order to increase the intensity of the roasted flavor, impart a fuller peanut flavor, enhance the roasted color of the peanut butter, and the like. While some of these attempts have minimized the presence of dark specks in the product, the bitter aftertaste often imparted to the product had to be compensated for by increasing its sweetener content.

U.S. Pat. No. 3,619,207 to Dzurik et al. (assigned to The Procter & Gamble Co.) discloses a method for producing a peanut butter in which the particle size of the peanut paste is controlled by a homogenizing step after initial grinding. This patent discloses that up to about 5% peanut skins, by weight, of the peanut paste may be incorporated into the peanut paste during homogenization of the peanut paste. The particle size of all components in the peanut paste is such that the largest particle is no more than 80 microns, and preferably at least 55% of the particles are in the range of 8-20 microns and preferably no more than 30% of the particles are less than 10 microns in size. This particle sizing is accomplished due to high pressure and high velocity homogenizer conditions. As the level of peanut skins is increased into the range of 2-4% by weight of the peanut butter product, it becomes necessary to add additional sweeteners, at least 3% by weight and, preferably 4-10% by weight, to obtain an acceptable taste in the final product. This homogenized peanut butter with the added skins is said to have an appearance comparable to conventional peanut butter, that is, about the same or fewer specks as compared to conventional peanut butter.

It has been determined that if 100% native skins were left in a conventional peanut butter that they would make up about 3.5% of the weight of such finished product. However, problems of bitterness (i.e., off flavors) and of visible specks predominate in conventionally processed peanut butters having over about 0.15% peanut skins based on weight of peanut derived components.

An attempt was made to produce a conventional (that is, not highly sweetened) peanut butter containing 100% of the normal skin component and a major portion of the germ (50-60%). This product was speck laden as if it were sprinkled with larger particles of black pepper. Thereafter, this speckled product was passed through a Gaulin type homogenizer to further reduce the skin (speck) size and the attempt was successful in reducing the undesirable characteristics.

It was felt that the peanut skins might be directly introduced into the homogenizer for size reduction. This proved to be unsuccessful since the skins clogged the homogenizer. Then an attempt to disperse the skins by milling with a peanut butter product, resulting in a product containing pepper-like specks. It was further observed that homogenization and/or excessive milling of the total mass to reduce particle size of the skins caused a loss of desirable flavor volatiles and the presence of off flavors due to the high temperature generated during milling.

THE INVENTION

The peanut skin ingredient of this invention is an emulsion-type product that contains finely ground peanut skins having a particle size of less than 70 microns. When incorporated into conventionally prepared peanut butter, it is found that the finely milled skin does not produce dark specks and the peanut butter prepared according to the prior art exhibits no bitter off flavors. Even though the peanut butter contained significantly greater amounts of peanut skins when the skin ingredient is added to it, the sweetener content of the peanut butter does not have to be increased as the peanut butter does not impart a bitter aftertaste.

Furthermore, the peanut butter product containing the higher level of peanut skins is found to impart a richer peanut flavor, is creamy and easy to spread, exhibits good mouth feel and melt down in the mouth, is of a uniform rich, brown color, and is free of dark specks.

The skin ingredient of the invention is obtained by milling peanut skins that are recovered during conventional friction-type blanching of peanuts. The peanut skins are milled to a powder using conventional apparatus such as an Alpine mill until 100% of the powdered peanut skins are capable of passing through at least a 100 mesh screen (150 micron). A slurry is then prepared with the powdered peanut skins and a food grade oil such as refined peanut oil and it is then mixed in a Hobart blender until a uniform, homogeneous blend is obtained in the form of an emulsion. The weight ratio of skins to oil is about from 1:1 to about 1:3. Thereafter, the particle size of the slurry is reduced to permit 100% of the skins to pass through a 200 mesh standard screen (75 microns) by processing through a Gaulin type homogenizer or a roller type mill to form a slurry which is very uniform in color and size. To prevent separation of this final oleoresin type slurry, emulsifiers and/or stabilizers may be added to maintain a uniform product with age.

The following examples are set forth to further illustrate the invention. In the examples, all amounts are by weight percent based upon the peanut paste.

EXAMPLE I

Skins obtained from conventional blanching of roasted peanuts were processed through an Alpine mill until the skins were in the form of a powder, and the particle size was reduced to below 150 microns. 200 Grams of the powdered peanut skins were mixed with 200 grams of deodorized peanut oil using a Hobart blender. The blended components were further processed through a Ross roller until the skin particle size was smaller than 74 microns.

The skin ingredient obtained as described above was added to conventional peanut butter at various levels to determine the effect it would have on the color of the peanut butter.

The results obtained are tabulated below wherein the color values are expressed as percent reflectance based on the Gardner Colorgard method:

TABLE I
Effect on Color of Peanut Butter Containing Various Amounts of Food Ingredient

| Sample | % Powdered Peanut Skins Based on Available Skins | % Powdered Skins based on Total Product | Color (% Reflectance) |
|---|---|---|---|
| 1 (Control) | 0 | 0 | 26.8 |
| 2 | 25 | 0.875 | 24.2 |
| 3 | 50 | 1.75 | 22.1 |
| 4 | 75 | 2.625 | 19.7 |
| 5 | 100 | 3.5 | 18.8 |

As indicated in Table I, the relationship of added skins to the change of the color of the peanut butter was such that the peanut butter became darker as the peanut skin-oil emulsion was added to the peanut butter up to the "natural" weight of skins for the amount of peanuts utilized. There were no noticeable specks and the product took on a much darker but uniform appearance as the equivalent skin content reached the 75% and 100% levels. The higher skin levels were at the threshold of color change.

EXAMPLE II

The same procedure was followed as in Example I above except that a peanut butter processed to a different roast level was used. The weight ratio of peanut skins to oil was 1:1 and the roasted unblanched peanuts contained 3.9% by weight peanut skins. The results obtained are set forth in Table II below.

TABLE II

| Sample | % Powdered Peanut Skins Based on Available Skins | % Powdered Skins based on Total Product | Color (% Reflectance) |
|---|---|---|---|
| 6 (Control) | 0 | 0 | 24.8 |
| 7 | 25 | .975 | 21.5 |
| 8 | 50 | 1.95 | 19.8 |
| 9 | 75 | 2.925 | 17.6 |
| 10 | 100 | 3.9 | 16.0 |
| 11 | 125 | 4.875 | 14.7 |
| 12 | 150 | 5.85 | 13.8 |

As can be seen from the results set forth in Tables I and II above, the color of each of the peanut butters darkened as the amount of peanut skin-oil emulsion in the peanut butter was increased.

EXAMPLE III

Similar emulsions were prepared following the procedure of Example I except that 2 parts by weight and 3 parts by weight peanut oil were added to 1 part milled peanut skins. As the amounts of oil were increased, the mixing times to form an emulsion decreased and the increased oil contents permitted more accurate metering of skin content. It was noted, however, that a large amount of emulsion was necessary to be added to give the same color and flavor results as the more concentrated 1:1 mixtures of the earlier examples.

The peanut skin edible oil emulsion of the present invention may be used as a coloring agent for other food products. In such case, the edible oil need not be peanut oil, but may be a food grade oil such as cottonseed oil, palm oil, palm kernel oil, coconut oil, corn oil, soybean oil, and the like. The emulsion may require suitable stabilizers and/or emulsifiers to keep the particulate matter in suspension.

We claim:

1. A process for obtaining a peanut skin-oil emulsion free of bitter off-flavors useful for adjusting peanut butter color and flavor comprising
   grinding peanut skins until 100% of said ground skins are capable of passing through at least a 100 mesh screen;
   mixing said ground skins with a food grade oil at a weight ratio of ground skins to oil in the range of about 1:1 to about 1:3; and,
   blending said ground skins-oil mixture until a uniform, homogeneous blend is obtained.

2. The process of claim 1 wherein said skins are ground to reduce particle size until 100% of said skins are capable of passing through at least a 200 mesh screen.

3. The process of claim 1 wherein said food grade oil is a member selected from the group consisting of peanut oil, cottonseed oil, palm oil, palm kernel oil, coconut oil, corn oil, soybean oil, and mixtures thereof.

4. The process of claim 3 wherein said food grade oil is peanut oil.

5. A peanut skin-oil emulsion free of bitter off-flavors consisting of a uniform, homogeneous blend of ground peanut skins and a food grade oil, the particle size of said peanut skins being no greater than about 70 microns and the weight ratio of said ground peanut skins to said food grade oil being in the range of from about 1:1 to about 1:3.

6. The peanut skin-oil emulsion of claim 5 wherein the particle size of said ground peanut skins is no greater than about 20 microns.

7. The peanut skin-oil emulsion of claim 5 wherein said food grade oil is a member selected from the group consisting of peanut oil, cottonseed oil, palm oil, palm kernel oil, coconut oil and mixtures thereof.

8. The peanut skin-oil emulsion of claim 7 wherein said food grade oil is peanut oil.

* * * * *